(12) United States Patent
Poveda et al.

(10) Patent No.: US 11,665,126 B2
(45) Date of Patent: *May 30, 2023

(54) COMMUNICATIONS AND ANALYSIS SYSTEM

(71) Applicant: SETTLEITSOFT, INC., Margate, FL (US)

(72) Inventors: Efrain Antonio Garcia Poveda, Plantation, FL (US); Martha Catherine Henry, Boca Raton, FL (US)

(73) Assignee: Settleitsoft, Inc., Miramar, FL (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/367,472

(22) Filed: Jul. 5, 2021

(65) Prior Publication Data
US 2021/0336919 A1 Oct. 28, 2021

Related U.S. Application Data

(63) Continuation of application No. 16/570,978, filed on Sep. 13, 2019, now Pat. No. 11,057,338, which is a continuation of application No. 15/298,762, filed on Oct. 20, 2016, now Pat. No. 10,462,096.

(51) Int. Cl.
| | |
|---|---|
| *G06F 15/16* | (2006.01) |
| *H04L 51/234* | (2022.01) |
| *H04L 51/23* | (2022.01) |
| *H04L 51/222* | (2022.01) |
| *H04L 51/10* | (2022.01) |

(52) U.S. Cl.
CPC ............ *H04L 51/234* (2022.05); *H04L 51/10* (2013.01); *H04L 51/222* (2022.05); *H04L 51/23* (2022.05)

(58) Field of Classification Search
CPC ..... H04L 51/234; H04L 51/10; H04L 51/222; H04L 51/23
USPC ................................ 709/206, 201, 202, 203
See application file for complete search history.

(56) References Cited

U.S. PATENT DOCUMENTS

2011/0007638 A1* 1/2011 Xu ..................... H04L 65/765
370/252

* cited by examiner

*Primary Examiner* — Lan Dai T Truong
(74) *Attorney, Agent, or Firm* — The Law Firm of AQ Basit

(57) ABSTRACT

An electronic communications method includes sending, by a user device, an electronic communication to a device. The electronic communications method further includes receiving, by the user device, an electronic confirmation message. The electronic communications method further includes sending, by the user device, electronic information. The electronic communications message further includes receiving, by the user device, a value. The value is based on electronically analyzing simultaneous electronic information being sent to the device. The electronic communications message further includes receiving, by the user device, an electronic recommendation message. The electronic recommendation message includes a recommended schedule of communications based on the score. The electronic communications method further includes sending, by the user device, an electronic request message based on the value and the electronic recommendation message.

20 Claims, 12 Drawing Sheets

| ID (902) | TIME DELAY (904) | ACCOUNT TYPE (906) | GEOGRAPHIC LOCATION (908) |
|---|---|---|---|
| JGSI45 | 28 DAYS OVER | CC | NEW YORK |
| OPSGE9 | 55 DAYS OVER | FURN | BOSTON |
| UYHJ55 | 100 DAYS OVER | AUTO | MIAMI |
| ⋮ | ⋮ | ⋮ | ⋮ |

COMMUNICATIONS AND ANALYSIS SYSTEM

BACKGROUND

Various computer applications allow for multiple individuals to interact with each other by using various technological process that use electronic text, email, video, and audio messaging systems. However, these particular computer applications do not allow for a user to interact with other users by using past behavioral metrics, statistics and patterns to schedule future communication events and activities.

BRIEF DESCRIPTION OF DRAWINGS

FIG. 9 is an example database structure that stores electronic information.

DETAILED DESCRIPTION OF PREFERRED EMBODIMENTS

Figure 1:
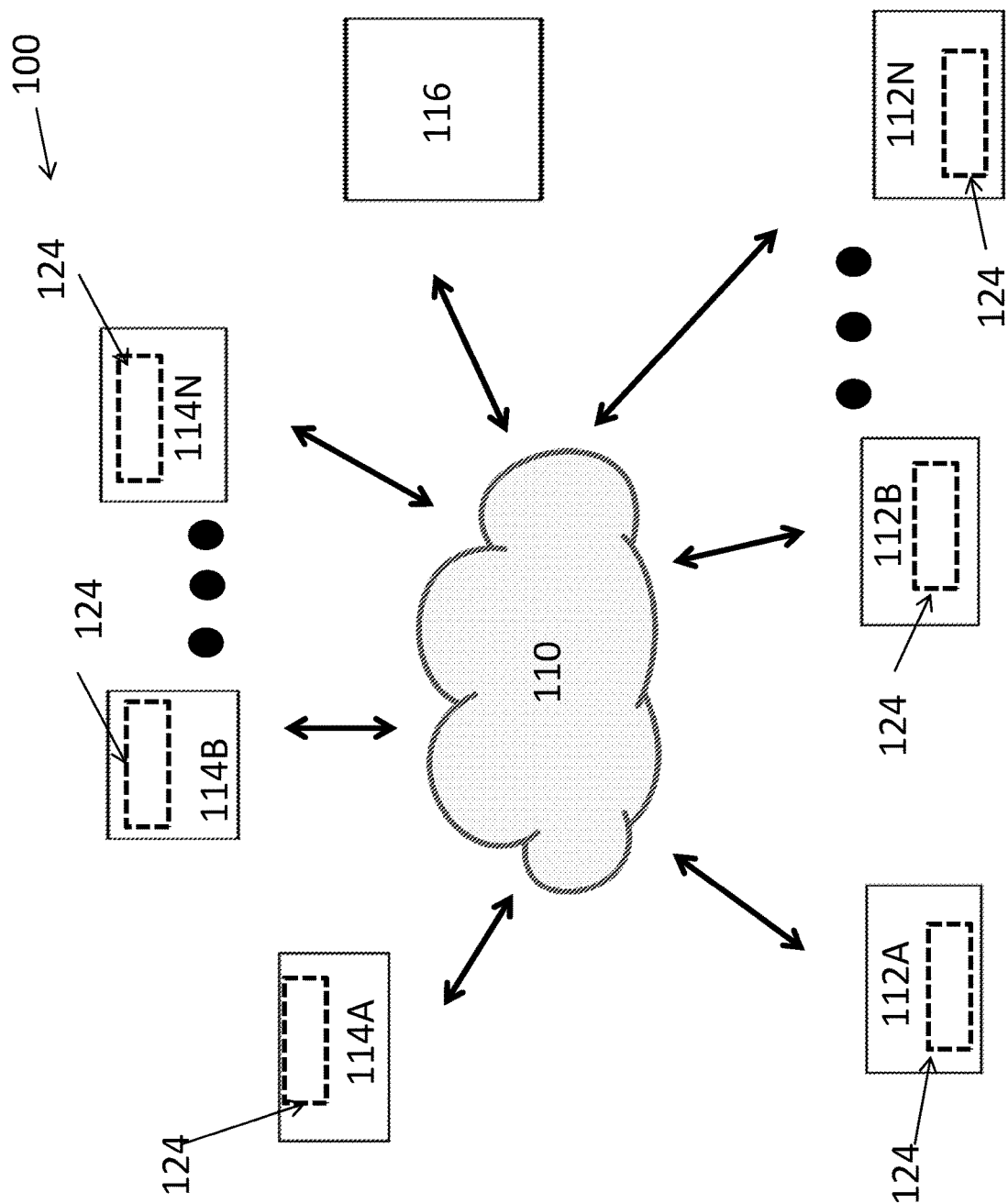
FIG. 1 is a diagram of an example environment in which systems and/or methods described herein may be implemented.

The following detailed description refers to the accompanying drawings. The same reference numbers in different drawings may identify the same or similar elements.

Systems, devices, and/or methods described herein may allow for a user, using an electronic application, implemented on a computing device (e.g., smartphone, laptop, etc.), to interact, via secure electronic communications processes, with other users that could be based on behavioral metrics of the user and the behavioral metrics of other different users. For example, a user, using a computing device, may decide to use an electronic application to provide electronic information relating to that user's personal history (e.g., age, address, status, etc.). In embodiments, the information may be electronically inputted by the user or obtained automatically based upon an identifier associated with the user. As such, based on the received electronic information, the electronic application may analyze the user's electronic information as well as other user's electronic information. In embodiments, the analyzed electronic information may be past communications or the lack of past communications, past events and/or activities. Furthermore, the analyzed electronic information may include analyzing the amount of time that has occurred beyond a deadline upon which a particular communication, event and/or activity was supposed to occur. In embodiments, a recommendation is generated based on the analysis of the information provided by the user in the electronic application. In embodiments, the recommendation may contain a call to action by the user, based on the analysis and score determined by the electronic application. In embodiments, the call to action may suggest that the user engage in electronic communications processes by acting as a requesting party, inviting a receiving party to communicate via the electronic application.

In embodiments, not only by user's decision, but upon analyzing the user's electronic information, the electronic application may also provide an electronic message that recommends future electronic communications for an outstanding matter between the user and other parties. In embodiments, one or more users may act as the requesting party to invite one or more other parties acting as the recipient party to establish communications and/or negotiations via an electronic application through any of the invitation methods of establishing communications described above. In embodiments, such invitation is based on the individual user's decision and/or by the recommendations of electronic application. For example, the electronic application may include a recommendation that the user initiate a single communication or multiple communications before a particular time in the future. In embodiments, the user may electronically accept the communications system's recommendation or may provide their own alternative relating to when to initiate future electronic communications. Once the user has decided, the user provides their decision to the electronic application and the electronic application may send an electronic message including, but not limited to, the primary or alternative types of communications, chosen by the user, between the user and the electronic application. Thus, in embodiments, the requesting user may forward their decision to engage in a communication process through the electronic application to a recipient user (e.g., a recipient party). In embodiments, the requesting user may send such decision by certified mail, courier, fax, the electronic application, and/or other methods. In embodiments, once the requesting user's decision is sent to the recipient party the other recipient party may only communicate with the requesting user via the communications system associated with the electronic application. In embodiments, the recipient party must electronically accept the requestor's decided method of electronic communications by signing up in the electronic application before the electronic application can provide any electronic communications based on the requesting user's proposed schedule of electronic communications.

In embodiments, once the recipient party becomes a user of the electronic application, the recipient party user may send an electronic message to the requesting user, via the electronic application, that indicates whether the recipient party accepts the requesting user's proposed schedule of electronic communications or whether the recipient user has rejected the request. Once the recipient user has decided on a schedule, the recipient user may input another electronic message, including the schedule, via the communications system within the electronic application, to the requesting user. In embodiments, the requesting user and the recipient party may come to an agreement based on the schedule of the electronic communications established for further electronic messages between the requesting user and the recipient party.

Accordingly, in embodiments, the invitation method of establishing communications (e.g., electronic and/or non-electronic) between users of the electronic application includes (1) a requesting party selecting the invitation method by which they wish to initiate establishment of communications with the recipient party within the electronic application; (2) the requesting party enters any additional necessary user information and the information about the recipient; (3) a generic invitation generated by electronic application has generic text and information related to the invitation method of communication (e.g. Invitation Letter, etc.); (4) an invitation generated by the electronic application that includes specific text and information related to the purpose of the invitation method of communications (e.g. Cease and Desist Letter, etc.); (5) an invitation generated by the electronic application (e.g., a Negotiation Offer, etc.) including specific text and information related to the substance of the invitation method of communication; (6) the electronic application saves the invitation and related information; (7) the electronic application electronically sends the generated invitation to the user (e.g., via email); (8) the user may view the invitation within the electronic application in an email account, web browser, etc.; (9) the user selects a method of delivery for the invitation (e.g., email, certified mail, fax, etc.) within the electronic application; (10) the invitation is delivered to the Receiving Party, by the user (e.g., the requesting party), via the delivery method determined by the user in the electronic application.

In embodiments, the invitation may be responded to within a particular threshold of time. In embodiments, if the invitation is not accepted or responded to within the particular threshold of time, a new invitation may be generated based on the processes described above. In embodiments, a method of communication may be chosen for the new invitation.

In embodiments, once the recipient party accepts the invitation, recipient party account setup information is verified and authenticated. In embodiments, if the information provided in the invitation does not match information provided by the recipient party within the electronic application, the account is not set up. In embodiments, after electronically confirming and verifying the account information, communications between the two parties may be initiated via the electronic application. In embodiments, multiple channels of communications are initiated and all communications channels between the two parties are private and secured.

If the recipient party does not set up an account (e.g., does not accept the invitation) or the recipient party's account information fails verification and/or authentication process, no communications can be established by the electronic application between the requesting user and the recipient party. In embodiments, based on the communication method of the invitation and the type of recipient party, and the time lapse, the electronic application may generate additional electronic recommendations to the requesting party regarding additional options that may be available to the requesting party. In embodiments, the electronic recommendations may include using processes outside the electronic application, a different method of delivery of the invitation, etc. Accordingly, the purpose of establishing communications is to ensure that the recipient party/parties may only communicate with the requesting party and/or parties via the electronic application. In embodiments, once the recipient party/parties become registered with the electronic application, secure communications channels may be established via an electronic application.

Accordingly, the electronic application may (i) obtain electronic information, (ii) analyze the electronic information, (iii) determine recommendations (iv) provide a virtual electronic channel of communications between different users, (v) provide a secure communications process as the only way that different users can electronically communicate with each other, and (vi) electronically assist different users to come to an agreement of a schedule of electronic communications. As such, the electronic application may reduce the need to spend additional computing and communications resources to independently create electronic recommendations and generate electronic interactions between two or more users using different computing devices. Also, the electronic application may increase and improve other types of electronic transactions that would not have occurred without the electronic application's analysis of a universe of user's behavior and patterns relating to other user's schedule of electronic communications and/or any other type of electronic transactions.

FIG. 1 is a diagram of example environment 100 in which systems, devices, and/or methods described herein may be implemented. FIG. 1 shows network 110, user device 112A, user device 112B user device 112N, other user, other user device 114A, other user device 114B . . . other user device 114N, and server 116.

Network 110 may include a local area network (LAN), wide area network (WAN), a metropolitan network (MAN), a telephone network (e.g., the Public Switched Telephone Network (PSTN)), a cloud computing network, a group of networks, an ad hoc network, an intranet, the Internet, a satellite network, a GPS network, a fiber optic-based network, and/or combination of these or other types of networks. Additionally, or alternatively, network 110 may include a cellular network, a public land mobile network (PLMN), a second generation (2G) network, a third generation (3G) network, a fourth generation (4G) network, a fifth generation (5G) network, and/or another type of network. In embodiments, network 110 may allow for devices describe in FIGS. 1 and 2 to electronically communicate (e.g., using emails, text, chats, SMS, electronic signals, URL links, web links, electronic bits, fiber optic signals, wireless signals, wired signals, etc.) with each other so as to send and receive various types of electronic communications.

User device 112A, 112B . . . 112N (collectively known hereafter as user device 112 in the singular or user devices 112 in the plurality) may include any computation or communications device that is capable of communicating with a network (e.g., network 110). Other user device 114A, 114B . . . 114N (collectively known hereafter as other user device 114 in the singular or other user devices 114 in the plurality) may include any computation or communications device that is capable of communicating with a network (e.g., network 110). For example, user device 112 and/or other user device 114 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), any mobile device with Intranet/Internet capabilities, or another type of computation or communications device.

User device 112 and/or other user device 114 may receive and/or display content. The content may include schedule of electronic communications, objects, data, images, audio, video, text, files, any type of electronic documents, and/or links to files accessible via one or more networks. Content may include a media stream, which may refer to a stream of content that includes video content (e.g., a video stream), audio content (e.g., an audio stream), and/or textual content (e.g., a textual stream). In embodiments, an electronic application may use an electronic graphical user interface to display content and/or information via user device 112 and/or other user device 114. User device 112 and/or other user device 114 may have a touch screen and/or a keyboard that allows a user to electronically interact with the electronic application. In embodiments, a user may swipe, press, or touch user device 112, and/or other user device 14 in such a manner that one or more electronic actions will be initiated by user device 112 and/or other user device 114 via the electronic application.

User device 112 and/or other user device 114 may include a variety of applications, such as, for example, an e-mail application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.) and/or any type of web based or cloud applications.

Server 116 may include one or more computational, domains, database or communication devices that gather, process, store, and/or provide information relating to one or more web pages or electronic pages associated with electronic application 124 that is searchable and viewable over network 110. While FIG. 1 shows a single server 116 there may be additional servers 116 associated with one or more electronic applications 124.

Electronic application 124 may be capable of interacting with server 116 to analyze electronic information and determine various metrics that are then used to recommend to one or more users, using user devices 112 and/or other user device 114, on how and when a user should electronically communicate with another user. In embodiments, electronic application 124 may be stored by and electronically receive electronic interactions from user device 112 and/or other user device 114. In embodiments, electronic application 124 may interact with application programming interfaces (APIs) to obtain electronic information about any user from other electronic applications. In embodiments, electronic application 124 may be electronically configured to show photos, video, text, electronic content (e.g. PDF, etc.), icons, graphical images, buttons, navigation bars, navigation tree, help menu, tool tips, assistance windows, emoji's, and/or any other electronic information. In embodiments, electronic application 124 may electronically send/receive electronic information to/from server 116 to determine a particular electronic recommendation. In embodiments, electronic application 124 may electronically send/receive electronic information so as to allow a user, using electronic application 124, to interact with another user of electronic application 124 to come to an agreement on a particular communications schedule based on an electronic confirmation from any user. In embodiments, electronic application 124 may also provide electronic financial and budgeting tools to the user of device 112 and/or the user of other device 114, allowing a user to electronically input information associated with their past financial transactional history. In embodiments, such electronic financial tools may help the user to configure an electronic display of their current financial status based on their past financial transactional history. In embodiments, electronic application 124 may use this information about the current financial status to generate electronic forecasts and/or substantive electronic schedule proposals that are then used by the user to communicate with other users to satisfy outstanding debt balances.

Figure 2:
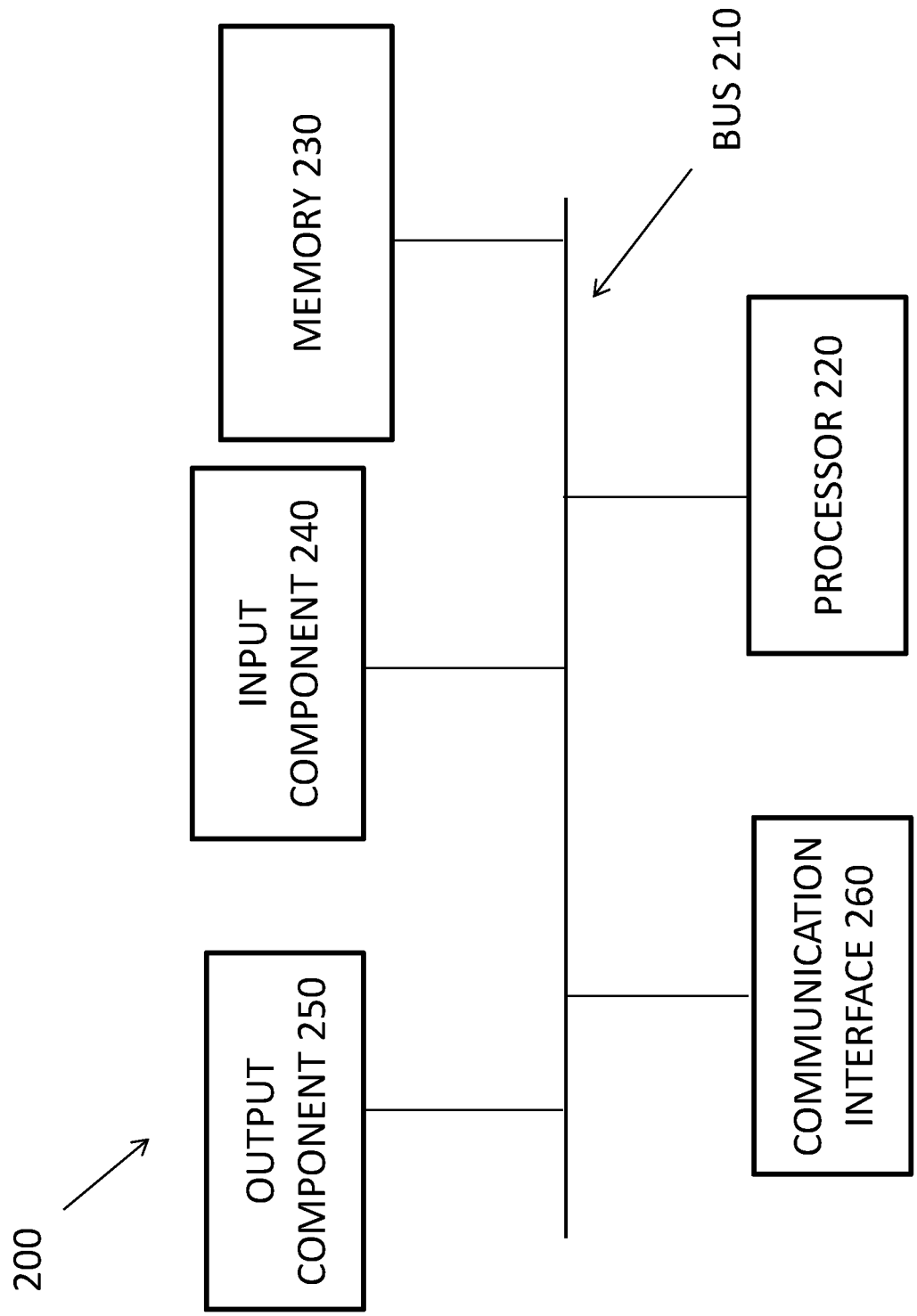
FIG. 2 is a diagram of an example computing device.

FIG. 2 is a diagram of example components of a device 200. Device 200 may correspond to user device 112, other user device 114, and/or server 116. Alternatively, or additionally, user device 112, other user device 114, and/or server 116 may include one or more devices 200 and/or one or more components of device 200.

As shown in FIG. 2, device 200 may include a bus 210, a processor 220, a memory 230, an input component 240, an output component 250, and a communications interface 260. In other implementations, device 200 may contain fewer components, additional components, different components, or differently arranged components than depicted in FIG. 2. Additionally, or alternatively, one or more components of device 200 may perform one or more tasks described as being performed by one or more other components of device 200.

Bus 210 may include a path that permits communications among the components of device 200. Processor 220 may include one or more processors, microprocessors, or processing logic (e.g., a field programmable gate array (FPGA) or an application specific integrated circuit (ASIC)) that interprets and executes instructions. Memory 230 may include any type of dynamic storage device that stores information and instructions, for execution by processor 220, and/or any type of non-volatile storage device that stores information for use by processor 220.

Input component 240 may include a mechanism that permits a user to input information to device 200, such as a keyboard, a keypad, a button, a switch, touchscreen, etc. Output component 250 may include a mechanism that outputs information to the user, such as a display, any type of screen, a speaker, one or more light emitting diodes (LEDs), etc.

Communications interface 260 may include any transceiver-like mechanism that enables device 200 to communicate with other devices and/or systems. For example, communications interface 260 may include an Ethernet interface, an optical interface, a coaxial interface, a wireless interface, or the like.

In another implementation, communications interface 260 may include, for example, a transmitter that may convert baseband signals from processor 220 to radio frequency (RF) signals and/or a receiver that may convert RF signals to baseband signals. Alternatively, communications interface 260 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 260 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 260 and transmit the RF signals over the air, and receive RF signals over the air and provide the RF signals to communications interface 260. In one implementation, for example, communications interface 260 may communicate with network 110.

As will be described in detail below, device 200 may perform certain operations. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
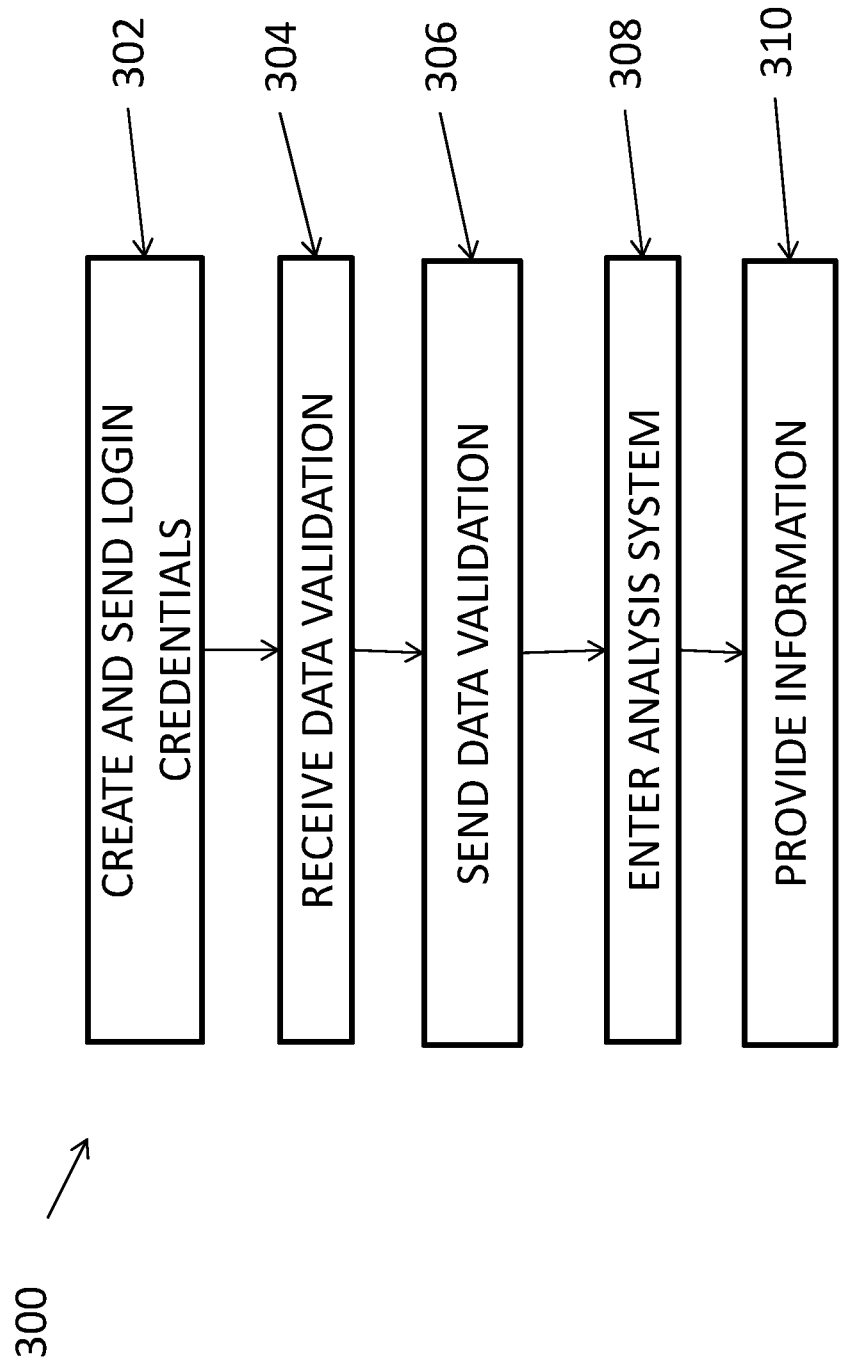
FIG. 3 is a flow chart of an example process for creating login credentials.

FIG. 3 is a flow chart of an example process 300 for creating login credentials. In embodiments, example process 300 may be performed by electronic application 124 using user device 112, other user device 114, server 116, and/or other electronic applications and devices as described in FIG. 1.

At step 302, electronic application 124 is used by a user to create and send login credentials. In embodiments, the user may have previously signed up in electronic application 124 and/or downloaded the mobile application onto user device 112 and/or other user device 114, or the user may have performed an electronic search (e.g., via the Internet) and found a webpage associated with electronic application 124. Alternatively, the user may have received an electronic message (e.g., email) with an electronic link to electronic application 124. In embodiments, the user may enter a name and an email address. In embodiments, the user may provide additional information; however, electronic application 124 may only require the user's name and an email address to generate login credentials by electronic application 124. In embodiments, the login credentials are sent to server 116 for electronic validation.

At step 304, user device 112 and/or other user device 114 may receive an electronic data validation message from server 116. In embodiments, the electronic data validation message may be received within an email, a text message, a social network message, or any other type of electronic message that is viewable on user device 112 and/or other user device 114 screen. In embodiments, the electronic data validation message may request the user to select an electronic link that electronically communicates with electronic application 124.

At step 306, the user, using user device 112 and/or other user device 114, may send the confirmation message to server 116 regarding the electronic data validation message. Upon receiving the electronic data validation message, at step 308, server 116 may provide the user with the electronic capability to use user device 112 and/or other user device 114 to log into electronic application 124.

At step 310, the user may provide electronic information to electronic application 124, via user device 112 and/or other user device 114. In embodiments, the user may provide their (i) address, (ii) age, (iii) employment status, (iv) bank account information, (v) credit card information, (vii) consumer loan information, (viii) current financial status, and/or (ix) any other type of information. In embodiments, the user may enter each type of information or the user may use an identifier (e.g. social security number) that can be used by electronic application 124 and server 116 to submit electronic communications (e.g., simultaneously) to one or more other computing devices to obtain particular types of information about the user. Upon receiving the electronic information, electronic application 124 and/or server 116 may analyze the information as further described in FIG. 4. In embodiments, the user may enter different amounts of information. In embodiments, the user may initially enter a first level of information (e.g., name, email). In embodiments, as the user increases the use of electronic application 124, the user may enter additional information at a second level (e.g., home address, age, financial information, etc.). In embodiments, as the level of information increases, the ability of electronic application 124 to analyze the user's information increases in accuracy and detail.

In embodiments, electronic application 124 may also include various electronic features that may electronically assist the user to provide electronic information. In embodiments, electronic application 124 may include electronic videos, databases, text, tooltips, calculators, and electronic simulation features to assist the user while using electronic application 124. For example, the user may view videos on particular subjects to assist the user using electronic application 124 and in making a decision. In embodiments, electronic application 124 may analyze the user's inputted information to score the user's current financial status, thus may generate a recommendation on user device 112. In embodiments, electronic application 124 may automatically generate a video for display on user device 112. For example, if the user indicates bank account information that includes less value than a particular threshold, then electronic application 124 may electronically analyze the value and present a recommendation to improve a particular situation (e.g., increase a value greater than the particular threshold). In embodiments, electronic application 112 may have video support based on providing information on how to increase the bank account's (e.g., an electronic account) value beyond a particular threshold. In embodiments, electronic application 124 may also analyze the relationship between the time delay and/or time lapse with a particular account and the amount with another electronic account and may produce recommendations, videos or other electronic tools (e.g., electronic prediction tool) to generate electronic transactions on electronic application 124 to assist the user. In alternate embodiments, electronic application 124 may generate electronic advertisements based on the user's inputted information and user's behavior patterns received or requested from computing devices associated with a search engine. For example, if the user has inputted information associated with a particular product (e.g., shoes) or an online search for shoes, then electronic application 124 may generate an electronic advertisement for display based on the user's patterns on user device 112 about shoes.

Figure 4:
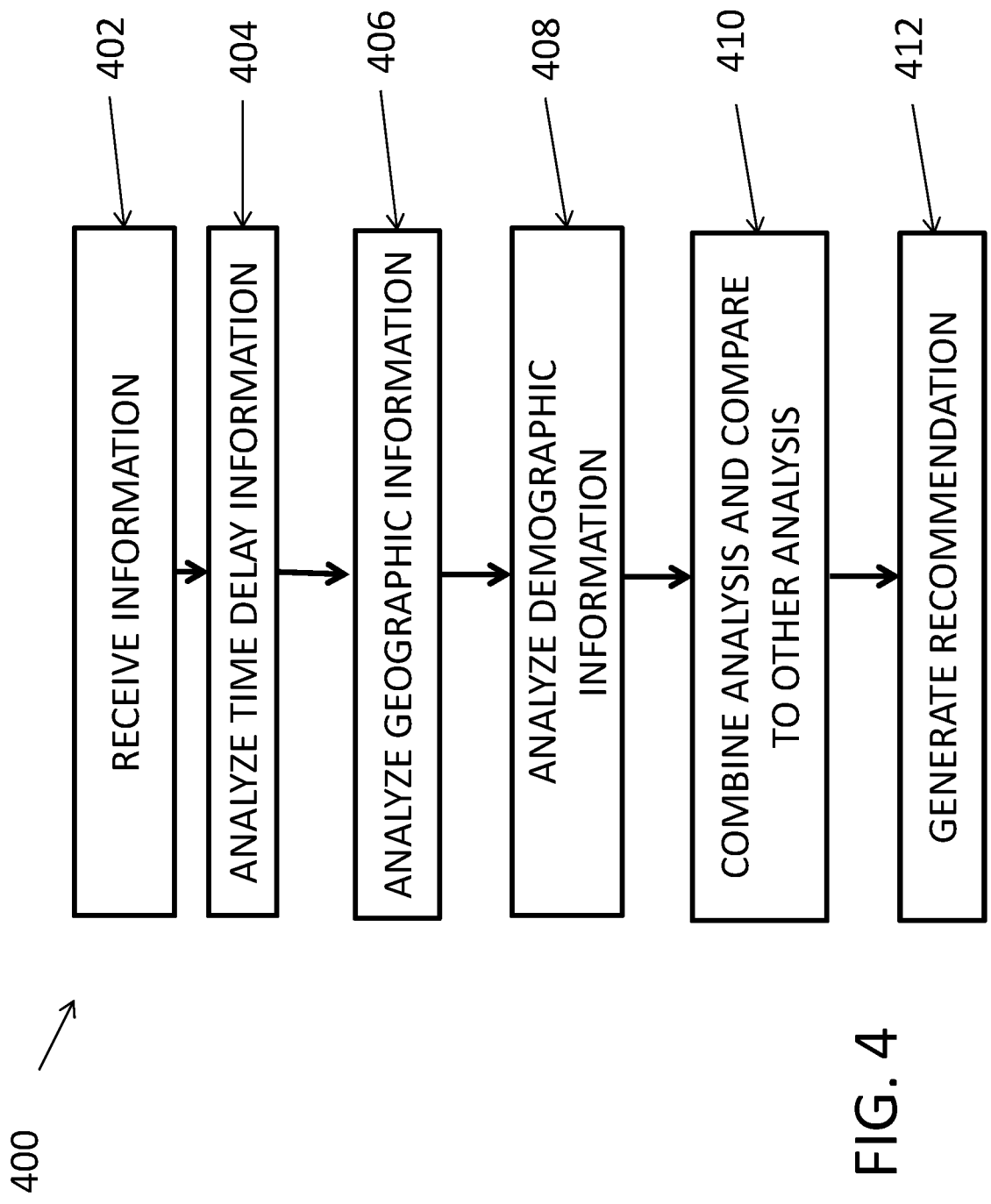
FIG. 4 is a flow chart of an example process for analyzing information.

FIG. 4 is a flow chart of an example process 400 for electronically analyzing electronic information, such as electronic information described in FIG. 3. In embodiments, one or more parts of electronic process 400 may be performed by electronic application 124, and/or server 116.

At step 402, electronic application 124 and/or server 116 may receive electronic information. In embodiments, the electronic information may include information about a user's age, gender, geographic location, employment history, bank accounts, credit card information, mortgages, automobile loan information, income, expenses, assets, other types of unsecured debt obligations, and/or any other personal and financial information. In embodiments, electronic application 124 may analyze patterns of lapses or lack of electronic transactions between different financial accounts. For example, electronic application 124 may analyze difference in time lapses associated with electronic transactions between different electronic accounts, analyze/ determine an average of time lapses associated with electronic transactions, and/or any other type of pattern.

At step 404, electronic application 124 and/or server 116 may analyze time delay information associated with any financial and electronic information. In embodiments, electronic application 124 and/or server 116 may analyze time delays associated with electronic communications that occurred between a user's computing device, or another computing device, and other user's computing devices. In embodiments, electronic application 124 and/or server 116 may analyze lack of electronic communications. In embodiments, the time delays may be associated with an electronic transaction that occurred in the past. In embodiments, the electronic transaction that occurred, or should have occurred (i.e., did not occur), in the past may be associated with the electronic transfer of tokens, bits, or other types of electronic data. Additionally, or alternatively, electronic application 124 and/or server 116 may provide electronic simulations of future electronic communications and electronic transactions. In embodiments, the electronic simulations may describe how to increase and/or decrease the value of an electronic account based on the user's information and real time analysis of other users using application 124, either by the user using user device 112 and/or the other user using user device 114. In embodiments, electronic application 124 and/or server 116 may analyze if the electronic transaction occurred before a particular deadline, if the electronic transaction occurred after a particular deadline and, as such, the period of time associated with the electronic transaction, or if the electronic transaction never occurred. In embodiments, electronic application 124 and/or server 116 may simultaneously analyze all information and determine an average of the time delay information or use other metrics to analyze the time delay information.

At step 406, electronic application 124 and/or server 116 may analyze geographic information associated with the electronic information (e.g. Internet Protocol address, etc.). In embodiments, the analysis of the geographic information may include the amount of time that the user has lived in that particular geographic location, determine average income for that geographic location (e.g., city/town, county, metropolitan area, etc.), unemployment rate for that geographic location, etc. In embodiments, the analysis of the geographic information may require electronic application 124 and/or server 116 to electronically communicate with other computing devices to receive particular electronic information associated with a geographic location.

At step 408, electronic application 124 and/or server 116 may analyze a user's electronic demographic information. In embodiments, the analysis of the demographic information may include analyzing the user's age, gender, and/or any other information. At step 410, electronic application 124 and/or server 116 may electronically analyze different information within the received electronic information and simultaneously compare the different information to electronic information associated with other users. In embodiments, the analysis with other users inputted information into electronic application 124 may be in real time. In embodiments, electronic application 124 and/or server 116 may store electronic information about the user and other users in a database (e.g., database 900 as described in FIG. 9). In embodiments, electronic application 124 and/or server 116 may generate a value (e.g., a score) based on the analysis of the user's behavior and other user's behaviors. In embodiments, the value may determine a recommendation to the user on how the user may electronically interact in the future.

At step 412, electronic application 124 and/or server 116 may generate an electronic message, which can be viewed on electronic application 124 via user device 112. In embodiments, the electronic message may include the value (e.g., score) and/or a recommendation to the user on how the user may electronically interact in the future. For example, the recommendation may include a message to the user to send electronic tokens or other information to another user associated with a particular time delay associated with an electronic account. In embodiments, electronic tokens may be associated with something of value. In embodiments, the electronic tokens, when transferred from a particular electronic account, may result in an electronic account's total memory usage on a computing device to be reduced based on the electronic transfer of the electronic tokens.

In embodiments, at step 412, or in any part of example process 400, electronic application 124 and/or server 116 may generate an electronic message that includes the ability of the user using electronic application 124 to electronically communicate with another user using user device 114 and/or other computing devices. For example, the user of electronic application 124 may communicate via electronic video, chat, and/or audio conversations or within an electronic virtual reality environment to obtain information (e.g., educational information) from other electronic educational systems (e.g., associated with lawyers, financial advisors, accountants, etc.)

In embodiments, when electronic application 124 and/or server 116 determines a score/value, electronic application 124 and/or server 116 may determine particular electronic videos and/or particular electronic educational systems, that may be included within electronic application 124 and/or provided by other electronic systems. In embodiments such interactions may be used by the user of electronic application 124 to accept or refuse recommendations from electronic application 124 and/or to take personal decisions to initiate future electronic transactions and/or communications via electronic application 124. For example, electronic application 124 and/or server 116 may generate a numerical score and/or a grade score (e.g., "A" for good, "B" for okay, "C" for bad). Based on the score, electronic application 124 and/or server 116 may electronically extract electronic videos that assist the user to prevent future lapses or delays in electronic transactions and/or communications. Additionally, or alternatively, electronic application 124 and/or server 116 may send an electronic communication to one or more electronic educational systems. In embodiments, the electronic educational system may be provided by electronic application 124 and/or be associated with a law firm, accounting firm, financial advisory firm, or any other type of organization. In embodiments, the electronic educational system may receive the electronic communication and electronically communicate with the user of electronic application 124.

In embodiments, a user of electronic educational system may initiate real time communications (e.g., video, chat and/or audio) with the user of electronic application 124 or vice versa. In embodiments, the user of electronic application 124 may electronically communicate with the electronic educational system and may accept and enter a third party recommendation to the electronic application 124 based on electronic communications from the electronic educational system. In embodiments, electronic application 124 may electronically analyze the information entered by the user and/or automatically entered by the electronic educational system during the real time communications within the electronic application 124 and automatically and/or simultaneously update the score generated by electronic application 124. Accordingly, electronic application 124 may educate users of electronic application 124 with electronic videos, video and/or audio conferences, electronic manuals, written material and/or any other type of interactive electronic document and/or communications. Furthermore, in embodiments, electronic application 124 and/or server 116 may provide, in real time and/or automatically, translate content and information in different language than English to the user.

Figure 5:
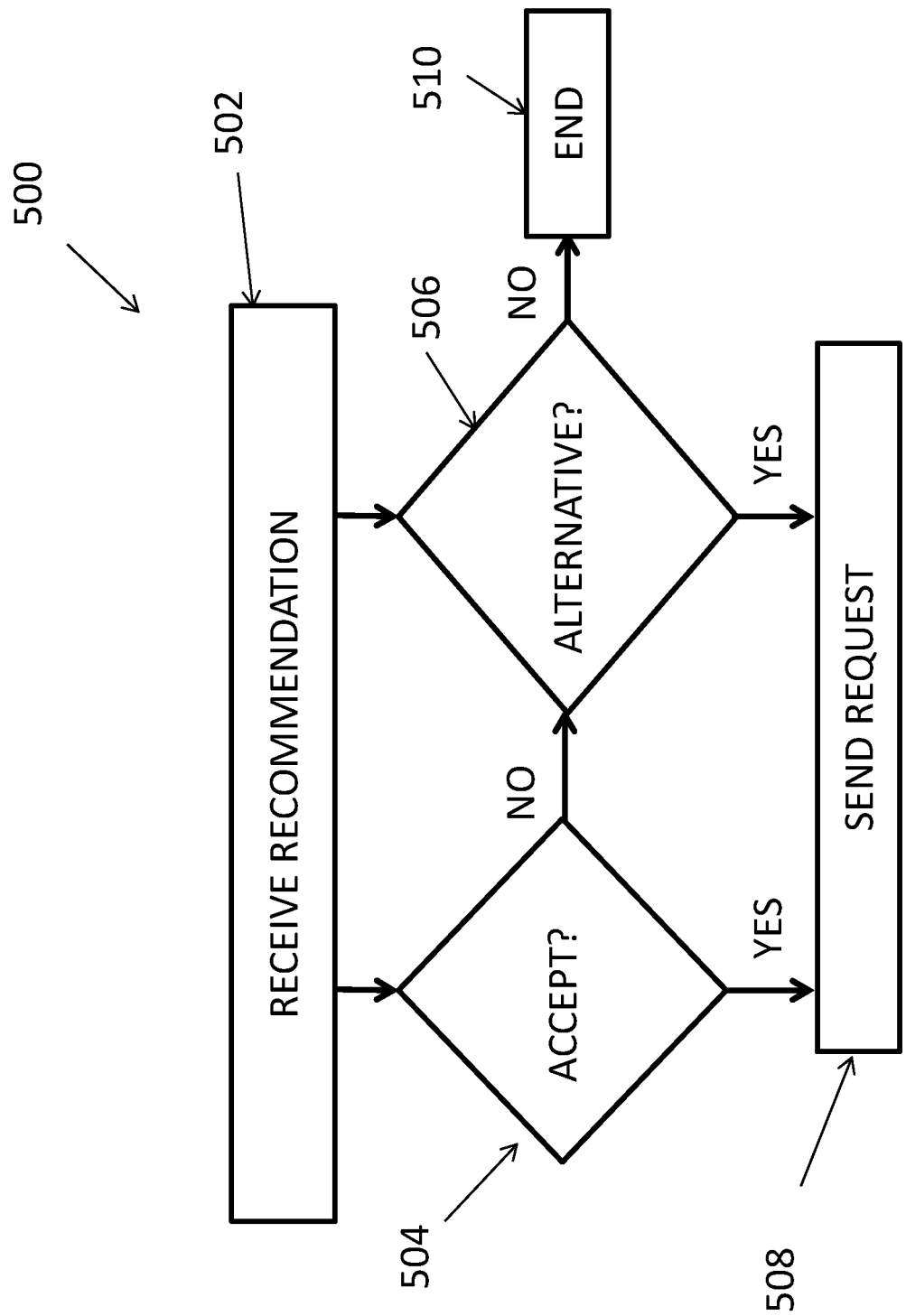
FIG. 5 is a flow chart of an example process for sending a request.

FIG. 5 is a flow chart of an example process 500 for sending an electronic request. In embodiments, process 500 may be performed by electronic application 124 on user device 112 and/or on other user device 114.

At step 502, a user, using user device 112 and/or other user using device 114, may receive a recommendation from electronic application 124 and/or server 116. In embodiments, the recommendation may be sent within electronic application 124, an electronic message, such as email, simple messaging system (SMS), system alert, and/or any other type of electronic message. In embodiments, the recommendation may be similar to the electronic recommendation message as described in FIG. 4.

At step 504, the user may accept the electronic recommendation message (Step 504—YES) or the user may not accept the recommendation (Step 504—NO). In embodiments, if the user accepts the recommendation, then electronic application 124 may send, at step 508, a request, based on the decision in electronic recommendation message, to another user. In embodiments, if the user does not accept the recommendation at step 504, then the user may, via electronic application 124, provide an alternative recommendation to another user at step 506. In embodiments, if the user provides an alternative recommendation (Step 506—YES), then the user may be provided with electronic tools within electronic application 124 to determine the alternative recommendation and/or enter, via electronic application 124, a recommendation of the user's choice. In embodiments, if the user does not provide an alternative (Step 506—NO), then electronic application 124 does not generate any further electronic communications. As such, electronic application 124 may wait for further instructions, from the user using user device 112 and/or the other user using other user device 114, before any further electronic activity is taken.

In embodiments, electronic application 124 may include electronic tools such as (i) electronic prediction and simulation tools, (ii) electronic calculators, (iii) graphical tools, (iv) communication tools, and/or (v) other types of tools. For example, electronic application 124 may have an electronic prediction tool that uses time delay information, as described above, to automatically determine a statistical value that the recommendation or an alternative recommendation may be electronically accepted by another user. In embodiments, the electronic prediction tool may use real time information from any user's electronic information being inputted into electronic application 124 and/or any other computer system that may directly interact with electronic application by the use of a unique identifier, at the same that electronic application 124 may be determining an alternative for its users. Furthermore, electronic application 124 may have communication tools that electronically request additional information to further determine whether any user's recommendation or alternative recommendation may be electronically accepted by another user. In embodiments, real time information from any user may be analyzed by electronic application 124 and a graphical representation may be generated. In embodiments, the graph may continuously be updated in real time an electronically generated graph, displayed on a user device 112 and/or other user device 114, as information is inputted into electronic application 124. In embodiments, electronic application 124 may have stored statistics, patterns, electronic documents, and any other electronic information about previous recommendations and associated success rates (e.g., the actual electronic transactions that occurred versus the predicted electronic transactions within the electronic application recommendations). In embodiments, the electronic statistical information, patterns, and graphical information may be electronically, and simultaneously, be generated within an electronic dashboard generated by electronic application 124. In embodiments, the electronic dashboard may be intermittently or continuously updated, electronically, with information based on the activities of the user or the activities of other users that are associated with electronic transactions and/or communications scheduled in the future, lapses in past electronic transactions, and/or a lack of past of electronic transactions. In embodiments, graphical information may be electronically updated with different colors based on the user's behavior (e.g., financial behavior) and/or the behavior of other users. Thus, in embodiments, the electronic dashboard may include an alternative. Accordingly, the user may send the alternative as the request in step 508.

Figure 6:
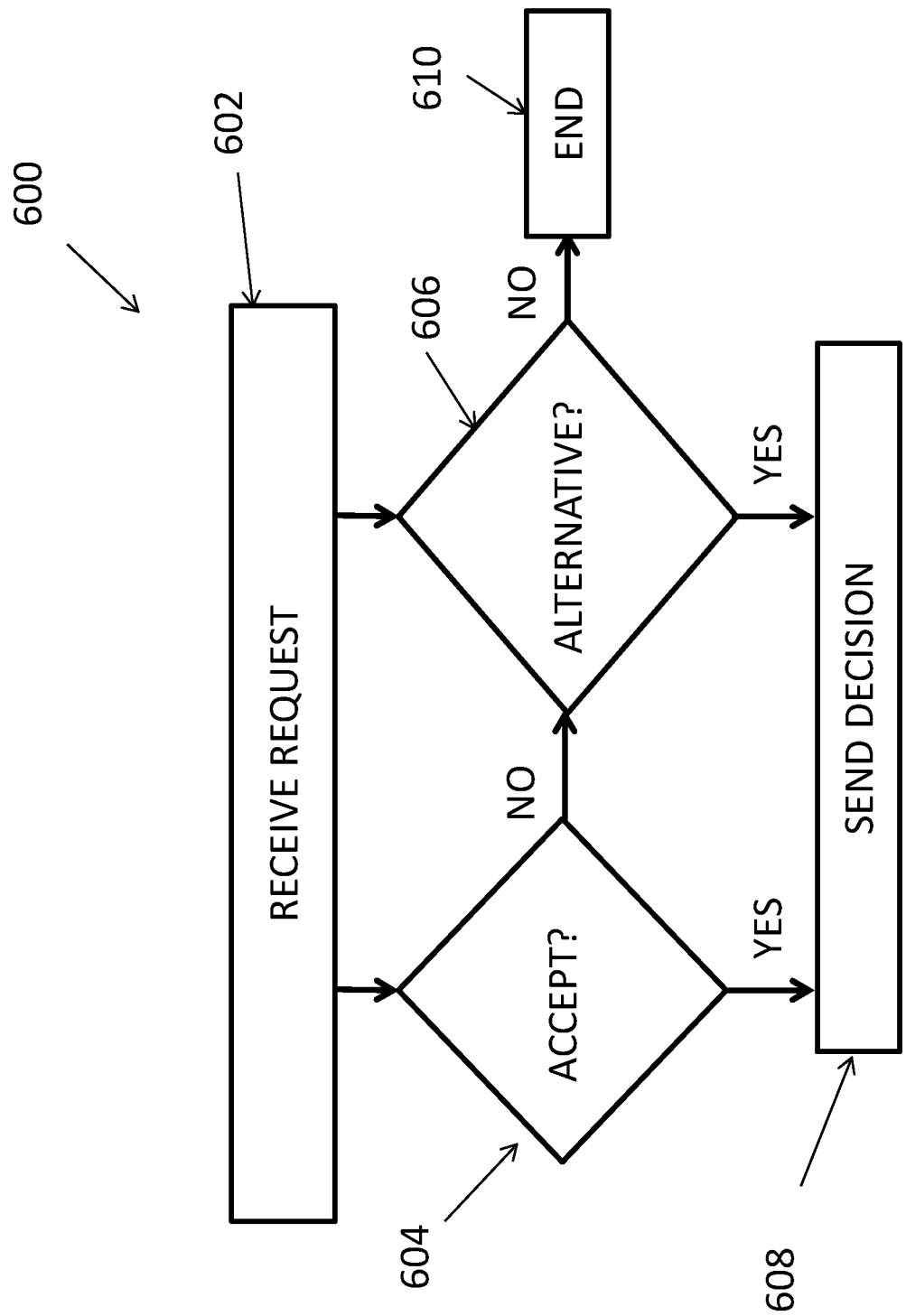
FIG. 6 is a flow chart of an example process for determining an electronic decision.

FIG. 6 is a flow chart of an example process 600 for determining an electronic decision. In embodiments, example process 600 may be performed by electronic application 124 via other user device 114. Alternatively, example process 600 may be performed by electronic application via user device 112 while sending and/or receiving communications to/from other user device 114.

At step 602, a user, using other user device 114, may receive an electronic request from user device 112. In embodiments, the electronic request may be similar to the electronic request as described in FIG. 5. In embodiments, the user, using other user device 114, may be associated with a bank, a financial institution, a debt collection agency, personal and/or legal representation, a government institution, a credit card company, any legal entity and/or any other type of for-profit or non-profit organization engaged in collecting, negotiating, restructuring, consolidating, refinancing and/or reducing any type of outstanding debt obligation whether by contract or not, or providing other services. In embodiments, the electronic request may be received within an electronic message. In embodiments, the electronic message may include one or more codes and/or identifiers that are required for the user of other user device 114 to access the electronic request within electronic application 124.

In embodiments, the electronic message may include a message, SMS, email, text, system alert, and/or electronic link that, when selected, may generate a bilateral real time electronic communications between user device 112 and user using other user device 114 through the secure virtual channel of communication of the electronic application 124 and/or server 116. In embodiments, the user may access the electronic request within electronic application 124 only if the user provides specific information that was included in the electronic message and validated by electronic application 124 and/or server 116. In embodiments, once the user, using other user device 114, has received from a user using user device 112, an invitation to communicate, a cease and desist letter, an initial communication of a schedule offer, and/or any other type of intention of communication through one or many electronic communication request until an agreement is reached between the user using user device 112 and the user using other user device 114, the user of other user device 114 may only communicate with the requestor, (e.g. user using user device 112), through such electronic application 124 and/or server 116 illustrated above and through no other types of communications.

At step 604, the user of other user device 114 may electronically accept the electronic request (Step 604—YES) or the user may not accept the electronic request (Step 604—NO). If the user of user device 114 does accept the electronic request, then electronic application 124, on other user device 114, may send an electronic message to user device 112 that indicates that the user of other user device 114 has accepted the electronic request, at step 608. If the user of other user device 114 does not accept the electronic request, then any user may, at step 606, generate an alternative recommendation (Step 606—YES). In embodiments, the user of other user device 114 and/or the user of user device 112 may input their own recommendation or they may use electronic tools within electronic application 124 to generate their own recommendation. Once the user has generated an alternative recommendation, at step 608, the alternative recommendation may be electronically sent to user device 112 for acceptance.

If the user of other user device 114 does not provide an alternative recommendation (Step 606—NO), then electronic application 124 may send an electronic message to user device 112 that the electronic request was not accepted.

Figure 7:
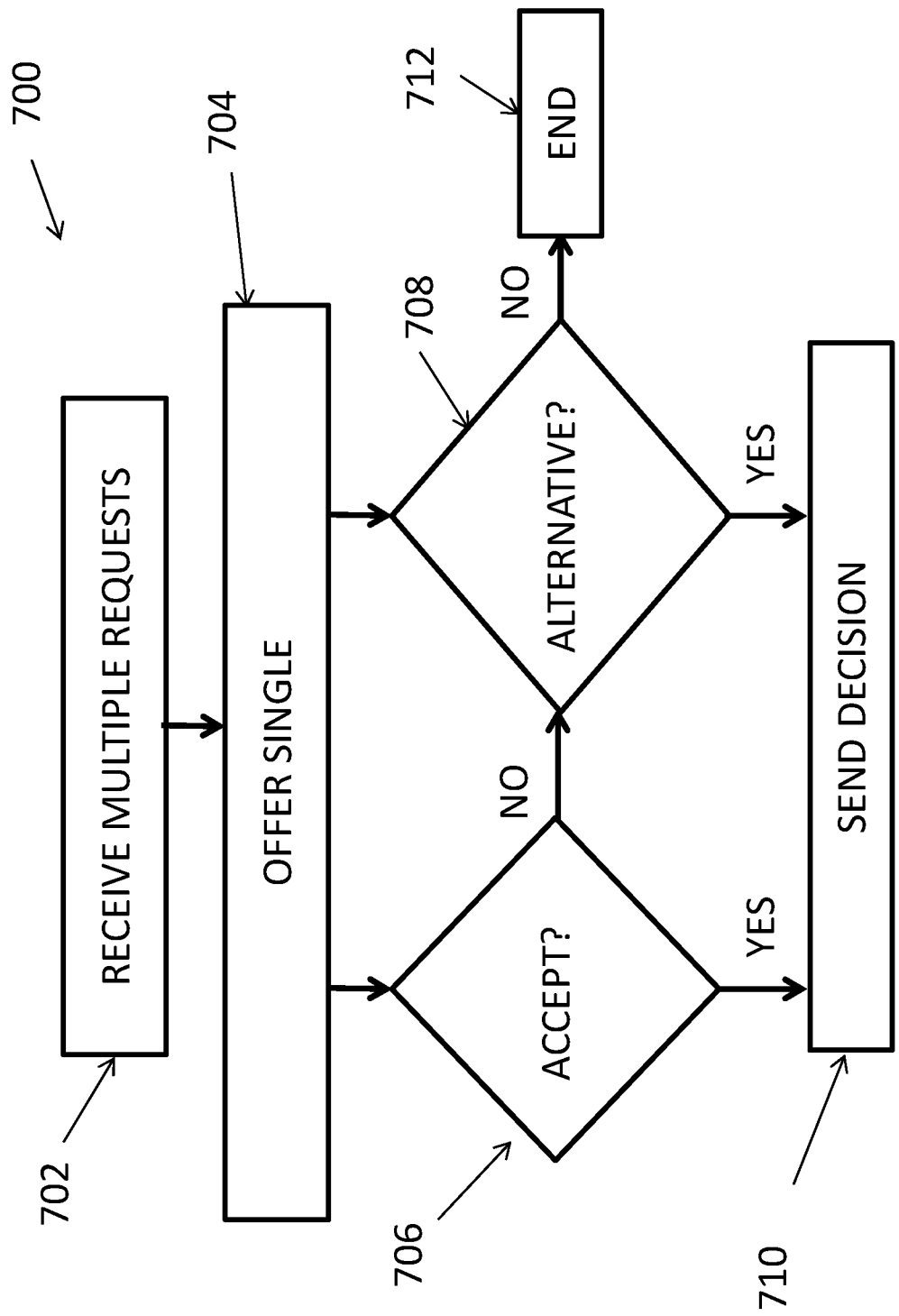
FIG. 7 is a flow chart of an example process of receiving multiple electronic communications.

FIG. 7 is a flow chart of an example process 700 for analyzing multiple electronic communications requests. In embodiments, example process 700 may be performed by other user device 114, user device 112, electronic application 124, and/or server 116.

At step 702, other user device 114 may receive a communicate by choice of the user of user device 112 either by certified mail, email, fax and/or by electronic requests from multiple user devices 112 for requests to electronically communicate with the user associated with other user device 114. In embodiments, the electronic requests may be similar to the electronic request described in FIG. 5. For example, XYZ is a company that is using other user device 114. Furthermore, in this example, Tom is a user of user device 1 (e.g., a user device 112) who is requesting to send electronic communications, in the future, to XYZ at any time and to electronically transfer 20 electronic tokens, or something of value, to a computing device, bank account, and/or any type of facility associated, operated and/or owned by XYZ. Jane is a user of user device 2 (e.g., a user device 112) who is requesting to send electronic communications, in the future, to XYZ and electronically transfer 30 electronic tokens, or something of value, to a computing device, bank account, and/or any type of facility associated, operated and/or owned by XYZ. In embodiments, all electronic communications occur within electronic application 124. In embodiments, the electronic transfer of electronic tokens may occur through the electronic application, other computing devices, API, and/or any type of financial services and simultaneously while electronic communications, tracking and validations are occurring within electronic application 124.

Accordingly, at step 704, electronic application 124 may generate a proposal from XYZ using other user device 114 to offer both Tom, Jane, and anyone else collectively or individually, the same and/or alternative schedule of future electronic communications and electronic transactions of electronic tokens. In embodiments, electronic application 124 may electronically and/or simultaneously analyze the time of the year that the requests are being made (e.g., beginning of year, end of year, middle of year, etc.), the type of debt associated with the requests, the time schedule associated with the electronic communications, the amount of the electronic tokens, and/or any other information.

In alternate embodiments, electronic application 124 may receive and/or generate tiers of electronic offers and associated electronic messages that the user of other user device 114 can send to different user devices 112. In embodiments, but not limiting to the following example, XYZ may receive and/or generate 100 requests. 50 of the requests are similar in electronic communications schedule (e.g., every 30 days) and/or a quantity of electronic tokens (e.g., within a particular range—e.g., plus or minus 1, 5, 10, etc. of a value) and the other 50 of the requests are similar with another electronic communications schedule and quantity of electronic tokens. Thus, in embodiments, electronic application 124 and/or server 116 may send an electronic recommendation message to the user of other user device 114 to provide an electronic offer message 1 to 50 of the electronic requests and electronic offer message 2 to the other 50 electronic requests. Accordingly, if the user of other user device 114 decided to generate the recommendation accepts, then with a single electronic input, two different electronic messages are simultaneously sent out to each user using user device 112 and/or particular group within the entire group of requests being made. In alternative embodiments, if the user of other user device 114 received a tier of electronic offers messages from users using user device 112, electronic application 124 and/or server 116 may send an electronic recommendation message to the user of other user device 114 to allow acceptance of electronic offer message. If user of other user device 114 decided to accept the recommendation, then with a single electronic input, various different electronic messages are simultaneously accepted and notification is sent out to each user using user device 112 and/or a particular group within the entire group of requests being made.

At step 706, however, the user (e.g., XYZ) may either accept the single offer (Step 706—YES) and electronic application 124 may send an electronic message with the single offer simultaneously to user devices 112 (e.g., being used by Tom, Jane, and others) in possibly different geographic locations; or, the user (XYZ) may reject the single offer (Step 706—NO) and decide on an alternative offer, electronic application 124 may send an electronic message with the rejection notification simultaneously to user devices 112. If, at step 708, the user of other user device 114 decides on an alternative offer (Step 708—YES), then the alternative single offer is sent, at step 710, to user devices 112 through the electronic application 124 and/or server 116. Accordingly, a single electronic input by the user of other user device 114 results in a single electronic communication using electronic application 124 being sent simultaneously to all the user devices 112 that sent a communication, message, notification and/or schedule request to other user device 114. If, at step 708, the user of other user device 114 decides not to send an alternative communication, then electronic application 124 may allow the user of other user device 114 the option to send individual decisions to each request or electronic application 124 may send a single electronic message via electronic application 124 simultaneously to all user devices 112 that all their requests have been rejected or electronic application 124 may allow the user of user device 112 the option to send individual communication, schedule, notification and/or offer to the user of other user device 114.

Figure 8:
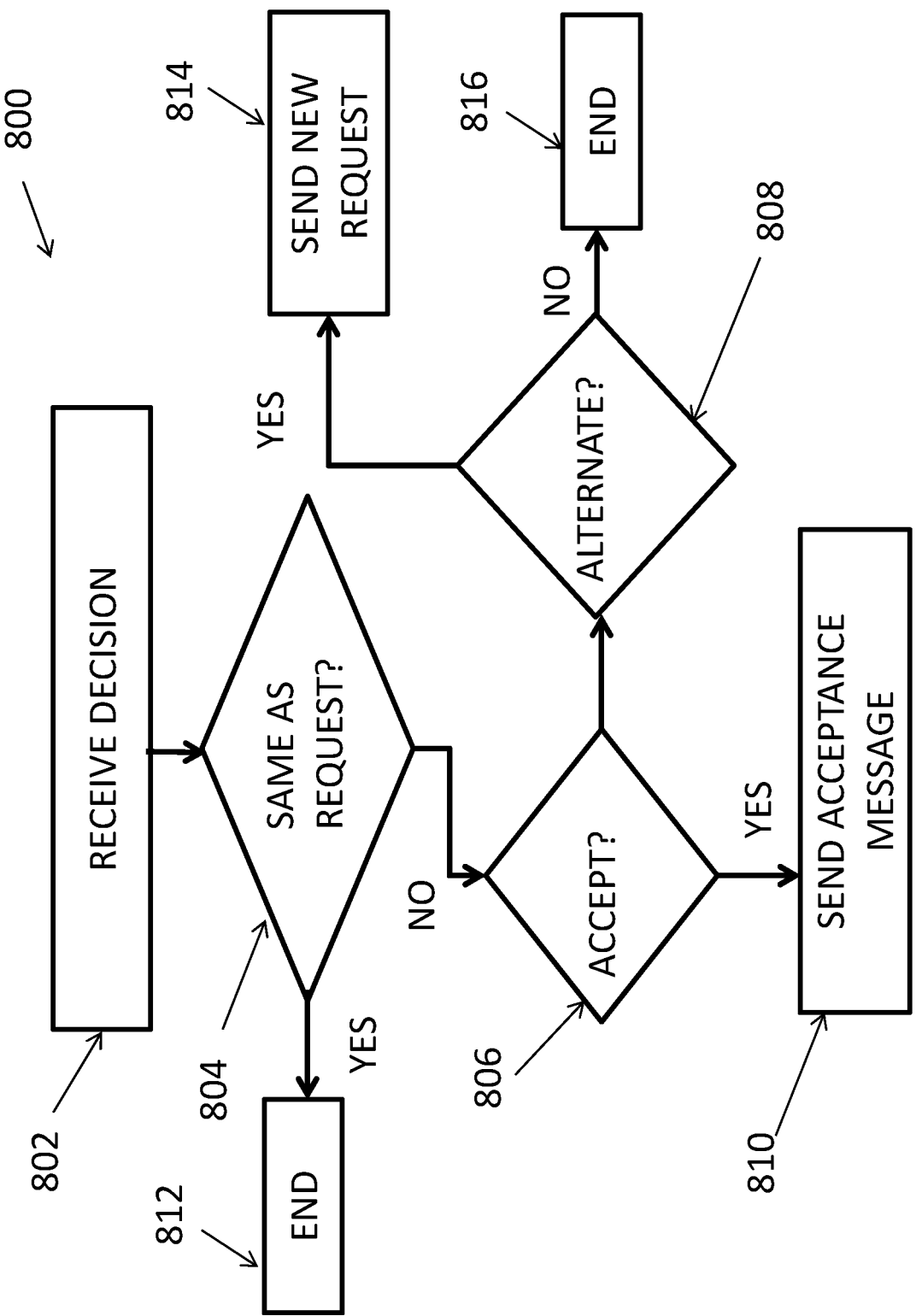
FIG. 8 is a flow chart of an example process of determining to send an electronic acceptance message.

FIG. 8 is a flow chart of an example process 800 for receiving an electronic acceptance. In embodiments, example process 800 may occur within electronic application 124 on user device 112 and/or server 116. In alternate embodiments, example process 800 may occur within electronic application 124 by using other user device 114 that sends/receives communications and information from user device 112.

At step 802, a user of user device 112 may receive an electronic message that includes a decision made by a user of other user device 114 regarding a request made by the user of user device 112 to electronically communicate and electronically transfer electronic tokens. If, at step 804, the decision is the same as the user, user device 112's request (Step 804—YES), then an acceptance is made and, at step 812, an agreement confirmation message is sent via electronic application 124 and/or server 116 to the requesting user and the other user who is accepting the request. In advantageous embodiments, electronic application 124 may provide electronic messages, electronic documents and forms to both the user of user device 112 and other user device 114 to initiate electronic transactions between the two parties following the agreement of a communication schedule request. If, at step 804, the decision is not the same as the user of user device 112's request (step 804—NO), then electronic application may request whether the user of user device 112 accepts the decision of the user of user device 114.

If, at step 806, the user of user device 112 electronically accepts (Step 806—YES) the decision of the user of other user device 114, then, at step 810, electronic application 124 may send an electronic message to other user device 114. If, at step 806, the user of user device 112 does not accept (Step 806—NO) the decision of the user of other user device 114, then electronic application 124 may request, at step 808, the user of user device 112 to provide an alternative. If the user of user device 112 provides an alternative (step 808—YES), then the alternative is sent as a new request, at step 814. In embodiments, the new request may then be sent to user device 114 and the user of other user device 114 may decide on the new request and may provide a decision which then follows example process 800 from step 802. In embodiments, a new request is sent through the electronic application 124 and/or server 116, which may have an electronic message system that allows for user device 112 and other user device 114 to simultaneously communicate (e.g., text message, SMS, email, chat, video message, etc.) while electronic data/information is being sent via electronic application 124 and/or server 116. Thus, electronic application 124 and/or server 116 allows for one or more interactive electronic communications channels between different computing devices (e.g., user device 112 and other user device 114) while simultaneously sending data on proposed electronic transactions, messages, schedule and communications. Accordingly, there are asynchrony and synchronic electronic communications on two or more different communication channel types within electronic application 124 and/or server 116 that are occurring at the same time and/or in real time.

If the user of user device 112 does not provide an alternative (Step 808—NO), then electronic application 124 may end the process (e.g., end, stand by until further instruction by any user using user devices 112 or other user device 114, etc.), at step 816, and send an electronic message via electronic application 124 and/or server 116 to the user of other user device 114 and/or user device 112 that no acceptance has occurred.

In embodiments, once user device 112 and other user device 114 have received electronic confirmation messages that accept a particular schedule agreement of electronic communications have been electronically signed and confirmed by the two parties using user device 112 and/or using other user device 114, the electronic application 124 and/or server 116 may generate an electronic schedule to transfer electronic tokens from a first electronic account to a second electronic account, a financial services institution and/or any other type of method for transferring amounts of electronic tokens agreed by the two parties. In embodiments, electronic application 124 may send electronic messages to the first electronic account and second electronic account that will permit automatic transfers of electronic tokens between these electronic accounts. In embodiments, electronic transaction may be done by direct bank account withdrawal, API services, and any other type of financial services system. In embodiments, the electronic accounts may be stored on one or more other computing devices, financial networks and/or cloud services. Upon the initiation of electronic messages transferred between user devices 112 and other user device 114, electronic tokens from the second electronic account may be automatically transferred to a third electronic account associated with the user of other user device 114. Accordingly, based on electronic communications within electronic application 124 and/or server 116, there may be simultaneous electronic transactions between, including but not limited to, the first and second account, and the third electronic accounts. Thus, in embodiments, electronic application 124 and/or server 116 may reduce the number of electronic communications necessary to initiate the transfer of electronic tokens from multiple electronic accounts.

FIG. 9 describes an example data structure 900 that stores asynchrony and synchronic electronic information associated with electronic application 124 and/or server 116, URL address, landing pages, any type of electronic web page. In embodiments, data structure 900 may include a collection of fields such as ID 902, Time Delay 904, Account Type 906, and Geographic Location 908. Although FIG. 9 shows example fields 902-908, in other embodiments, data structure 900 may include fewer fields, different fields, additional fields, and/or differently arranged fields than depicted in FIG. 9. In embodiments, one or more servers 116 may store some or all of data structure 900. In embodiments, electronic application 124 and/or server 116 may use example data structure 900 to generate future electronic communications and transactions without having a user, using user device 112 or other user device 114, to electronically query and then electronically determine time, values, and other characteristics of an electronic communication.

In embodiments, ID 902 may store a username of a user, of user device 112 and/or other user device 114, associated with electronic application 124 and/or server 116. ID 902 may include one or more alphanumeric symbols (e.g., letters, numbers, symbols, etc.). In embodiments, Time Delay 904 may store time delay information associated with when a particular schedule and/or electronic communications was supposed to have occurred and when the electronic communications did occur. In embodiments, Time Delay 904 may also store time lapse information associated with how many days have occurred since a particular deadline to perform an activity and/or electronic communication to transfer electronic tokens. In embodiments, Account Type 906 may store a type of electronic account associated with the user in ID 902. For example, the type may be a credit card, automobile loan, furniture loan, account number, company information, etc. In embodiments, geographic location 908 may store the geographic location of the user in ID 902.

In embodiments, server 116 and/or electronic application 124 may use data structure 900 to determine a score to user device 112 and/or a recommendation to a user of user device 112 and/or other user device 114. In embodiments, and as described in other figures, the score and/or recommendation may then be used by the user of user device 112 to take decisions about his/her current financial status and by personal choice invite to electronically communicate, with a user of other user device 114, a request to engage in a communication process, to reach a mutually agreement and to send a particular number of electronic tokens at particular time intervals.

In embodiments, each of the fields described in FIG. 9 may be associated with audit data fields. In embodiments, the audit data fields are associated with a log of all data/electronic transactions, i.e., an audit data trail. In embodiments, the audit data trail may ensure the end-to-end integrity of data activities by identifying when modifications are made, detect and analyze intentional and accidental breaches in user behavior, monitor and analyze the database activities of any user, and/or keep track of changes and updates made to data. In embodiments, the audit data fields may include, but not limited to, the following: audit data field (a) "Created Date Time Stamp, Created By User UserName or IP address or media access control ("MAC") address," audit data field (b) "Updated DateTime Stamp, Updated By User UserName or IP address or MAC address," audit data field (c) "Sequence Number, automatically incremented," audit data field (d) "Active Boolean," audit data field (e) "Active DateTime Stamp, Active By User UserName or IP address or MAC address," and audit data field (f) additional data fields may apply in certain entities, e.g., First Login Date, Last Login Date.

In embodiments, when information stored in data structure 900 is updated in electronic application 124 and/or server 116, electronic application 124 and/or server 116 may determine whether to update the information or to initiate an electronic audit clone process. In embodiments, electronic application 124 and/or server 116 may analyze the audit fields above as follows: (1) if the Sequence Number is 1 (one), i.e., no prior record exists, electronic application 124 will insert the new record/information and set the Active Boolean to true, triggering audit data fields (a), (b), (c), (e), and, if present, (f); (2) if the Sequence Number is not 1 (one) and the only data being updated is Active Boolean, electronic application 124 will update the record/information, triggering audit data fields (b), (e), and, if present, (f); (3) if the Sequence Number is not 1 (one) and the only data being updated is Active Boolean and/or audit data field (f), electronic application 124 will update the record, triggering audit data fields (b), (e) and, if present, (f); or (4) if the Sequence Number is not 1 (one) and there is updated data not categorized in Active Boolean and/or audit data field (f), an electronic audit clone process will take place.

In embodiments, if an electronic audit clone process, electronic application 124, may generate a 'clone' of the existing record. Furthermore, in embodiments, the existing record is updated with the audit data field "Active Boolean" set to false, triggering audit data fields (b), (c), (e), and, if present, (f). In embodiments, the 'clone' fields are set according to the data being updated. Thus, in embodiments, the 'clone' record is inserted, the Active Boolean is set to true—triggering audit data fields (a), (b), (c), (e), and, if present, (f). In embodiments, electronic application 124 may display to users of electronic application 124 either the Active Boolean with a value of true or display a history of all records, e.g., Sequence Number N, Sequence Number N-1, . . . . Sequence Number 1 (where Sequence Number N is the most recent record by Created Date/Time Stamp, with the Highest value for Sequence Number), with the Active Boolean Value. Thus, electronic application 124 and data structure 900 contains a full and complete history of all data updates and their set of audit data. In embodiments, this information may be used by electronic application 124 to make recommendations to the Users, based on presence/absence of data, time lapse, etc.

In embodiments, in addition to the electronic audit data trail, electronic application 124 may also maintain an electronic audit activity trail of the Entity, Record Key(s), Operation performed by User UserName, and Session. In embodiments, the audit data fields described above are applied to the Audit Activity Trail records. In embodiments, since records are never deleted, Active Boolean is used instead (e.g., false would equal deleted), PostInsert and PostUpdate operations are tracked. Thus, data structure 900 or any other data structure may contain a history of all data inserts and updates, by User, UserName, and Session. Accordingly, this information may be used by Application 124 to make recommendations to the Users, based on presence/absence of data, time lapse, etc.

In embodiments, during the Audit Location Trail, electronic application 124 tracks the location of Users, either by IP address or Mac address, for all visits. In embodiments, electronic application 124 tracks the visits of users and the specific pages accessed on each visit by each user. In embodiments, the same set of audit data fields described above is then applied to the Audit Activity Trail records.

Figure 10:
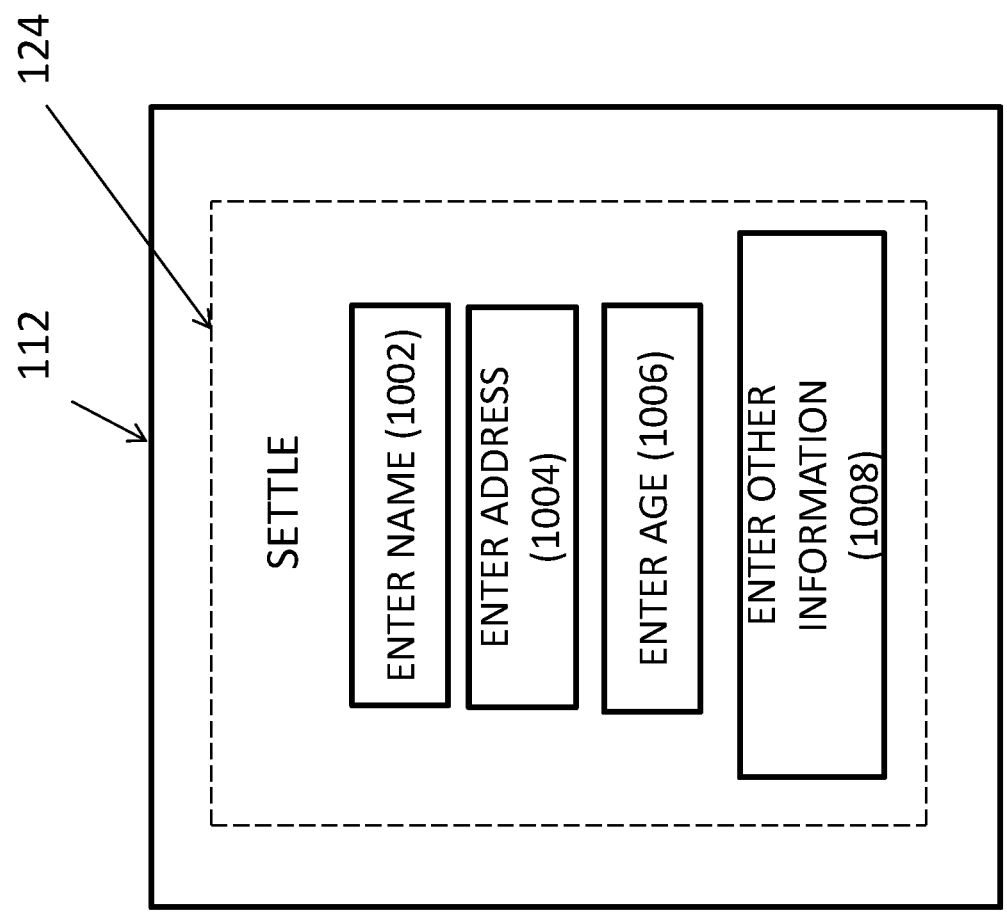
FIGS. 10-12 are example diagrams for sharing electronic communications.
Figure 11:
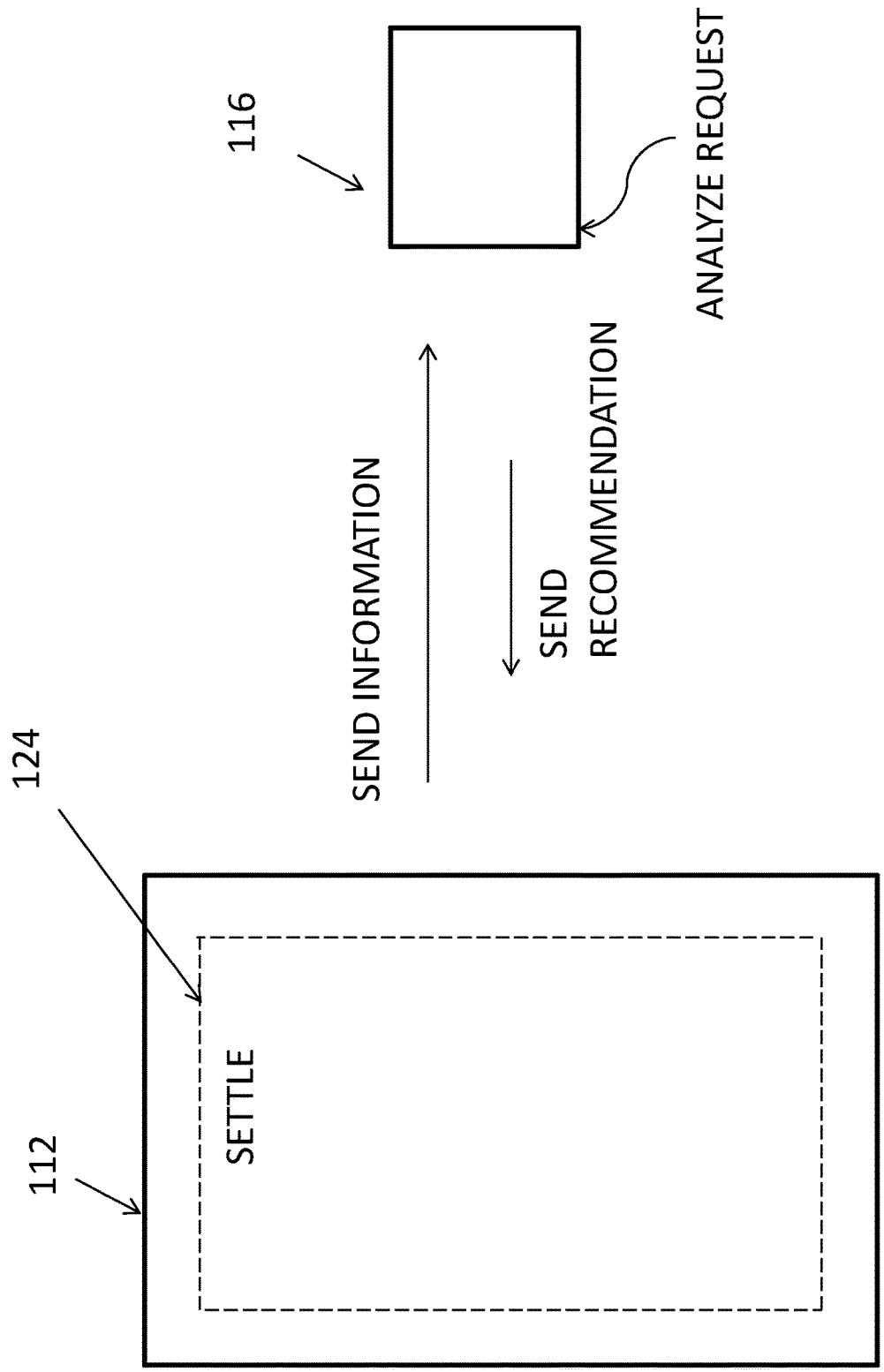
Figure 12:
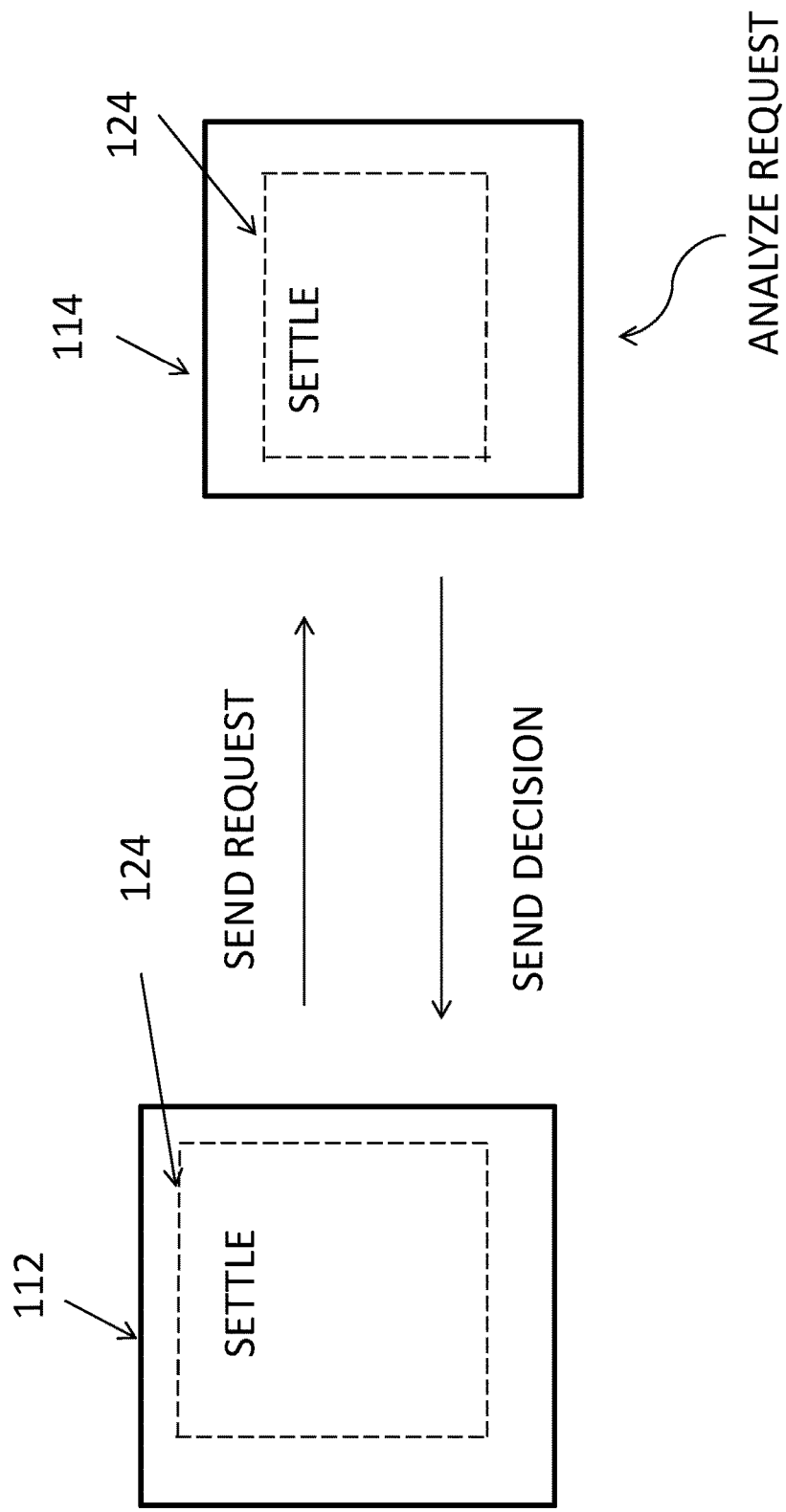

FIGS. 10-12 are diagrams of example processes for using an electronic application (e.g., electronic application 124) for generating an electronic invitation which the user of device 112 and/or other user device 114 will be forwarding to the other user requesting communication, with such another user, to accept a particular schedule of electronic communications and particular amounts of electronic tokens to be transferred from one computing device to another computing device, a financial institution, and/or a financial system. In embodiments, the example process described in the following figures may use one or more of the devices, networks, and electronic applications described in FIGS. 1 and 2. Furthermore, in embodiments, the example processes described in the following figures may have one or more features described in the flowcharts and/or data structure described in FIGS. 3-9.

FIG. 10 shows a user device 112 and electronic application 124 as described in FIG. 1. In embodiments, a user of user device 112 has decided to make a request to communicate with a user of other user device 114 or vice versa. In FIG. 10, for example, Sandra has decided to electronically communicate with ABC collection agency. In doing so, Sandra has decided to use electronic application 124 which is known as "SettleiTsoft." In this example, Sandra has already logged into electronic application 124. As shown in FIG. 10, Sandra provides additional information, including name using icon 1002, her home address using icon 1004, her age using icon 1006, and other financial information using icon 1008. In icon 1008, Sandra may provide her social security number. Once all the information is entered into electronic application 124, electronic application 124 electronically sends the information to server 116, as shown in FIG. 11. Upon receiving the information, server 116 analyzes Sandra's information. In particular, server 116 sends simultaneous electronic messages may be sent to other computing devices requesting additional information about Sandra by using Sandra's social security number. Accordingly server 116 receives additional information about Sandra, which could be manually inputted by Sandra or after electronic application 124 automatically interacted to other computer devices, and analyzes Sandra's information. For example, server 116 may have received information as described above that Sandra is 100 days beyond a payment deadline to a store credit card where she owes $5,000.

Accordingly, electronic application 124 and/or server 116 may take Sandra's information and also the information of other users who use electronic application 124 and determine an amount that will help Sandra to resolve her outstanding store credit card debt. For example, electronic application 124 may analyze how other users with similar types of loans debt were able to resolve their debts. Accordingly, electronic application 124 and/or server 116 may send an electronic recommendation message to Sandra, via user device 112, which recommends Sandra to make six months of payments of $500 for the store credit card debt. Based on the recommendation, in FIG. 12, Sandra may decide to send a request to ABC collection agency which is using other user device 114. This request may be sent by the user of user device 112 or the user of other user device 114 via certified mail, email, fax, and/or any legal conduit or such request may be sent in an electronic message by the electronic application, which includes a link and other information that allows ABC to log into electronic application 124 and/or server 116 using other user device 114 and view Sandra's request. ABC collection agency may view Sandra's request via electronic application 124. In this example, ABC collection agency may use electronic application 124 and/or server 116 to determine a statistical probability that Sandra will make the payments. Based on electronic application 124's analysis, ABC collection agency may decide to accept Sandra's request and sends a decision to Sandra, which is using user device 112.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement and to improve the aspects based on the description herein within the electronic application 124 and/or server 116.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

While various actions are described as selecting, displaying, transferring, sending, receiving, generating, notifying, tracking and storing, it will be understood that these example actions are occurring within an electronic computing and/or electronic networking environment and may require one or more computing devices, as described in FIG. 1, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on any type of display screen to electronically communicate with other computing devices as described in FIG. 1. Also it will be understood that any of the various actions can result in any type of electronic information to be displayed in real time and/or simultaneously on multiple user devices (e.g., user device 112 and/or other user device 114).

It should also be understood that electronic communications between user device 112, other user device 114, and/or server 116 via electronic application 124 may include the electronic transfer of electronic tokens, messages, electronic documents and/or agreements and may result in (i) the change of a value stored in a computing device, server and/or database based on one or more electronic communications, and/or (ii) the change in the amount of memory storage of electronic bits in a computing device, server and/or database based on one or more electronic communications. It should be noted that recommendations, requests, decisions, alternatives, and rejections are electronically generated types of communications and exist within an electronic computing environment.

In embodiments, electronic application 124 and/or server 116 may encrypt all data, including, but not limited to, Personally Identifiable Information (PII) for all Users. Furthermore, in embodiments, but not limited to, all computer processes, architecture, and/or electronic security may enhance the electronic security of electronic application 124 by controlling database access, time visitation controls, multiple request layers, etc.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

While series of blocks have been described with regard to FIGS. 3-8, the order of the blocks may be modified in other implementations. Further, non-dependent blocks may be performed in parallel.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
   sending, by a computing device, an electronic request to initiate communications;
   receiving, by the computing device, an electronic communication based on receiving the electronic request;
   generating, by the computing device, a value based on receiving the electronic communication,
   analyzing, by the computing device, a time delay associated with an electronic account associated with electronic information in the electronic communication, where the time delay is based on a difference in time between when a particular electronic communication actually occurred versus when the particular electronic communication was scheduled to occur;
generating, by the computing device, a score based on the analyzing the time delay associated with the electronic account;
analyzing, by the computing device, that the particular electronic communication that did not occur within a particular period of time,
  where the particular electronic communication is associated with a first identifier;
analyzing, by the computing device, that another electronic communication did occur within another particular period of time,
  where the other electronic communication is associated with a second identifier; and
analyzing, by the computing device, the particular electronic communication and the other electronic communication together to determine a pattern;
generating, by the computing device, a recommended schedule based on the score and the pattern,
  where the recommended schedule includes multiple electronic communications that are sent at particular future times by the user device to other devices,
sending, by the computing device, an electronic recommendation message that includes the score to another user device.

2. The electronic communications method of claim 1, wherein the analyzing the time delay includes analyzing a delay associated with transferring electronic tokens.

3. The electronic communications method of claim 2, wherein determining the pattern includes determining a level of electronic token transactions that occurred below a particular threshold within a particular amount of time.

4. The electronic communications method of claim 1, further comprising:
  determining, by the computing device, that an electronic confirmation response has not been received based on sending the electronic request message; and
  sending by the computing device, a second electronic request message.

5. The electronic communications method of claim 1, further comprising:
  receiving, by the computing device, an electronic confirmation response based on receiving the electronic request message, wherein the electronic confirmation response includes identification information; and
  electronically verifying, by the computing device, the identification information.

6. The electronic communications method of claim 1, wherein the electronic communication method reduces an overall number of particular electronic communications being sent to the user device and being received by the user device.

7. The electronic communications method of claim 1, further comprising:
  receiving, by the computing device, multiple electronic requests in addition to the electronic request from the electronic account;
  analyzing, by the computing device, the multiple electronic requests to determine that a first portion of the multiple electronic requests are associated with a first electronic characteristic and a second portion of the multiple electronic requests are associated with a second electronic characteristic;
  sending, by the computing device, a first particular recommendation to the first portion of the electronic requests; and
  sending, by the computing device, a second particular recommendation to the second portion of the electronic requests, where the second particular recommendation is sent simultaneously with the first particular recommendation.

8. A device, comprising a micro-processor to:
receive a first electronic communication from a user device,
  the first electronic communication include an electronic request and time delay information for previous electronic communications;
determine, based on the first electronic communication, a value,
  the value being based on the time delay information associated with an electronic account;
send a second electronic communication to the user device,
  the second electronic communication including a schedule of future electronic communications,
    where each of the electronic communications in the schedule of future electronic communications is scheduled to occur at particular times in the future;
receive a third electronic communication from the user device based on sending the second electronic communication, where the third electronic communication includes confirmation of the schedule of future electronic communication;
analyze a fourth electronic communication that did not occur within a particular period of time,
  where the fourth electronic communication is associated with a first identifier;
analyze that a fifth electronic communication did occur within another particular period of time,
  where the fifth electronic communication is associated with a second identifier;
analyze the fourth electronic communication and the fifth electronic communication together to determine a pattern, wherein the pattern is used to determine to the schedule of future electronic communications.

9. The device of claim 8, where the first electronic communication, the second electronic communication includes a score, and where the score is used to determine the timing of the future electronic communications.

10. The device of claim 8, where the fourth electronic communication and the fifth electronic communication are associated with one user identifier.

11. The device of claim 8, where the fourth electronic communication and the fifth electronic communication are each associated with different user identifiers.

12. The device of claim 8, where the first electronic communication includes electronic token information that was not sent at a particular time.

13. The device of claim 8, where the micro-processor is further to:
receive multiple electronic requests from other user devices in addition to the electronic request from the user device;
analyze the multiple electronic requests to determine that a first portion of the multiple electronic requests are associated with a first electronic characteristic and a second portion of the multiple electronic requests are associated with a second electronic characteristic;
send a first particular recommendation to the first portion of the electronic requests; and
send a second particular recommendation to the second portion of the electronic requests, where the second particular recommendation is sent simultaneously with the first particular recommendation.

14. A non-transitory computer-readable medium storing instructions, the instructions comprising:
one or more instructions that, when executed by one or more processors, cause the one or more processors to:
receive a first electronic message from a first user device,
analyze the first electronic message for time delay information associated with one or more electronic accounts,
wherein a value is based on a time delay associated with an electronic account associated with electronic information received in the first electronic message,
wherein the electronic account is also associated with a specific electronic communication that did not occur within a particular period;
generate a score based on the time delay information associated with the one or more electronic accounts;
send a second electronic message, including the score, and a recommended schedule of communications, to the first user device,
where the recommended schedule is generated before the value is determined, and the recommended schedule of communications occurs automatically and is simultaneously sent to multiple devices;
receive a third electronic message;
the third electronic message accepting or rejecting the recommended schedule of communications;
analyze a fourth electronic communication that did not occur within the particular period of time,
where the fourth electronic communication is associated with a first identifier;
analyzing that a fifth electronic communication did occur within another particular
period of time,
where the fifth electronic communication is associated with a second identifier; and
analyzing the fourth electronic communication and the fifth electronic communication together to determine a pattern that is used to determine additional electronic information in the second electronic message.

15. The non-transitory computer-readable medium of claim 14, wherein the recommended schedule of communications can be stopped if one or more of future communications, associated with the recommended schedule of communications, do not occur.

16. The non-transitory computer-readable medium of claim 14, wherein the score is based on geographical location.

17. The non-transitory computer-readable medium of claim 14, where the one or more instructions cause the one or more processors to further:
generate electronic multimedia based on the time delay information; and
send the electronic multimedia to the user device.

18. The non-transitory computer-readable medium of claim 17, wherein the time delay information is associated with previous electronic communications that did not occur at a scheduled time.

19. The non-transitory computer-readable medium of claim 17, where the one or more instructions cause the one or more processors to further:
send multiple electronic requests;
determine that a first portion of the multiple electronic requests are associated with a first electronic characteristic and a second portion of the multiple electronic characteristics requests are associated with a second electronic characteristic;
send a first particular recommendation to the first portion of the electronic requests; and
send a second particular recommendation to the second portion of the electronic requests, where the second particular recommendation is sent simultaneously with the first particular recommendation.

20. The non-transitory computer-readable medium of claim 19, where the one or more instructions cause the one or more processors to further:
receive electronic agreement messages based on a percentage of the sent first particular recommendations;
wherein the received electronic agreement messages are aggregated together.

* * * * *